March 8, 1927. 1,620,200
G. GODDU ET AL
FASTENING INSERTING MECHANISM
Filed Jan. 11, 1923
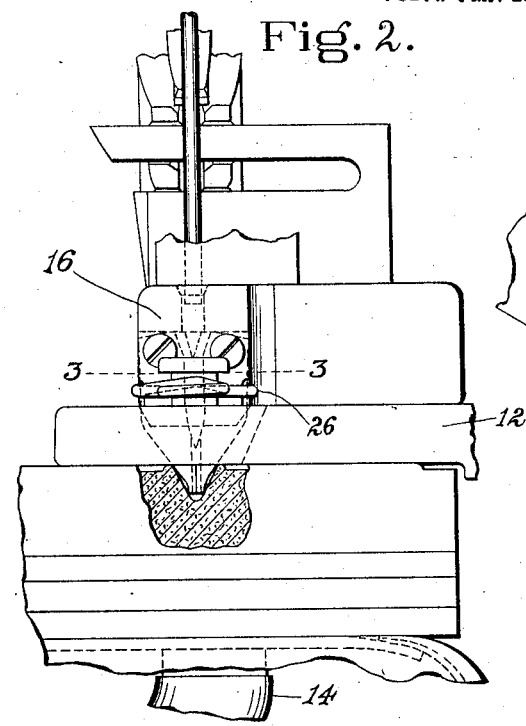
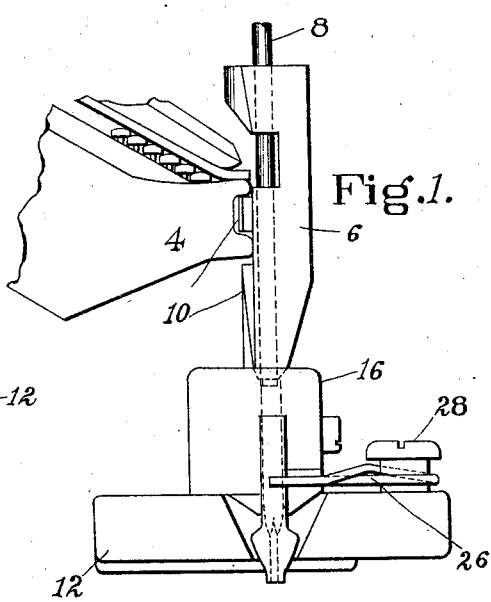
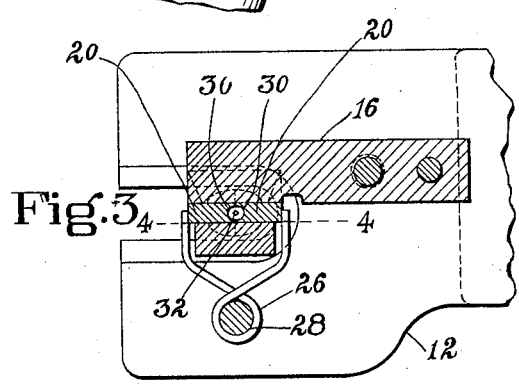
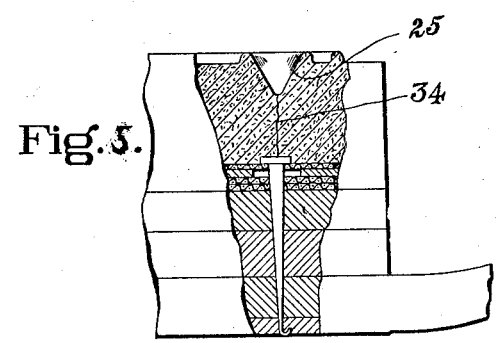
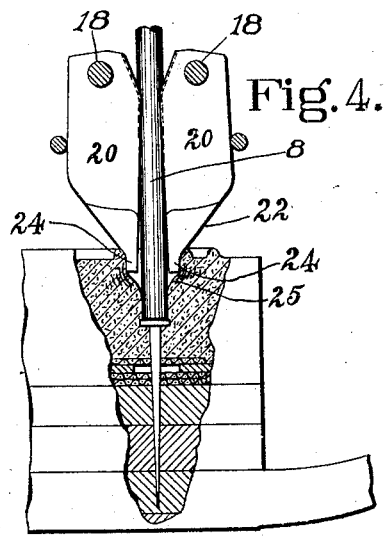
INVENTORS Patented Mar. 8, 1927.

1,620,200

UNITED STATES PATENT OFFICE.

GEORGE GODDU, OF WINCHESTER, AND FRED L. MACKENZIE, OF BEVERLY, MASSACHUSETTS, ASSIGNORS TO UNITED SHOE MACHINERY CORPORATION, OF PATERSON, NEW JERSEY, A CORPORATION OF NEW JERSEY.

FASTENING-INSERTING MECHANISM.

Application filed January 11, 1923. Serial No. 612,026.

This invention relates to fastening inserting machines and as illustrated herein with reference to the attachment of rubber heels to shoes.

It has recently been proposed to attach rubber heel members to shoes or to leather or leatherboard bases by blind nailing. A preferred method of performing this operation consists in stretching the rubber of the heel member before and during the driving of the nails so that each nail is driven through stretched rubber. When the rubber is released after the completion of the nailing operation the holes made by the driving of the nails close together over the heads of the nails in a very inconspicuous fashion.

It is an object of the present invention to provide a throat mechanism for fastening inserting machines of such a character as to facilitate this blind nailing operation.

With this object in view the illustrated construction comprises a plurality of movably mounted throat members arranged at their lower ends to enter a recess in the heel member. Means, illustrated as the driver of the machine, is arranged to force the throat members apart after their lower ends have entered the recess in the heel member to stretch the rubber of the heel member before and during the insertion of each fastening. Preferably and as illustrated, means is provided to equalize the movement of the different throat members away from their normal or inoperative position so that their movement will not displace the fastening during its insertion. This equalizing means is illustrated as a spring bearing against the outer surfaces of the throat members and yieldingly pressing them together.

With the above and other objects in view the invention will now be described in connection with the accompanying drawings and pointed out in the claims.

In the drawings:—

Fig. 1 is a front elevation of the throat members, driver and associated parts of a nail inserting machine embodying the present invention;

Fig. 2 is a side elevation of the same parts showing in addition the relation of the throat members to the work;

Fig. 3 is a horizontal section on the line 3—3 of Fig. 2;

Fig. 4 is a transverse section on the line 4—4 of Fig. 3, showing the driver of the machine in the position it assumes at the conclusion of a nail inserting stroke;

Fig. 5 illustrates a section through the heel portion of a shoe with a rubber heel member attached by blind nailing as herein described.

The present invention may be embodied in a nailing machine of any usual or known type, such a machine conveniently being provided with a raceway 4 arranged to carry nails to a driver guide 6 through which is reciprocated a driver 8. A separator 10 controls the passage of nails from the raceway to the driver guide. The machine is conveniently provided with a flat presser plate 12 against which the work is held by a work support 14 of any convenient construction. Rigidly connected to the presser plate is a throat block 16 in which are pivoted at 18 a pair of throat members 20, each tapering as at 22, towards its work engaging portion and terminating in a semi-cylindrical projection 24 arranged to enter a conical recess 25 of a rubber heel member. A spring 26 anchored at 28 to the presser plate 12 tends to force the throat members 20 together and to equalize their movement as they are forced apart in the manner hereinafter described.

Each of the throat members 20 is grooved as shown at 30, the two grooves co-operating to form a nail opening through the throat. This opening is preferably large enough at its upper portion to permit the free and unobstructed entrance of a nail but tapers down to almost nothing at its lower end, as indicated at 32 (Fig. 3), so that the nail will be held in the throat until engaged and forced into the work by the driver. As the driver moves down to drive the nail into the work, it forces the throat members 20 away from one another, since the lower and intermediate portions of the nail opening in the throat are of less diameter than the driver, so that the projections 24 of the throat members, which have been engaged in one of the conical recesses 25 formed in the tread surfaces of the rubber heel member, stretch the rubber of the heel member as they are forced apart and hold it in stretched condition during the driving of the nail, as indicated in Fig. 4. When, after the completion of the driving of the nail, the driver and throat are withdrawn from the work, the rubber is released and closes together over the nail, as indicated at 34 (Fig. 5).

Having thus described our invention, what we claim as new and desire to secure by Letters Patent of the United States is:—

1. A fastening inserting machine having a nozzle comprising a pair of pivoted members for engaging the work and tapering towards their work engaging portion each of said members terminating in a substantially semi-cylindrical projection.

2. A throat for fastening inserting machines arranged to facilitate the blind nailing of rubber heel members, comprising a pair of pivotally supported throat members grooved to form a throat opening between the two, and stretching means carried by said throat members arranged to enter a recess in a rubber heel member and movable to stretch the rubber of the heel member before the nail is inserted and to hold it in stretched condition during the insertion of the nail.

3. A fastening inserting machine having, in combination, a driver, and a plurality of movably mounted throat members arranged to enter a recess in a rubber heel member into which a fastening is to be inserted and to be engaged and forced apart by said driver before the fastening contacts with the heel member to stretch the rubber of the heel member and during the driving of the fastening into the heel member to maintain the rubber in stretched condition.

4. A fastening inserting machine having, in combination, a presser member, a throat comprising a plurality of movably mounted members projecting beyond the work engaging face of the presser member and arranged to enter a recess in a rubber heel member in which a nail is to be inserted, and means to force the throat members apart to stretch the rubber of the heel member preparatory to and during the insertion of a fastening.

5. A fastening inserting machine having a presser member, a throat comprising a plurality of movably mounted throat members projecting beyond the work engaging face of the presser member and arranged to enter a recess in a rubber heel held in engagement with the presser member, and a driver arranged to force the throat members away from one another to stretch the rubber of the heel member as the driver inserts a fastening therein.

6. A fastening inserting machine, having, in combination, a flat presser plate, a plurality of movably mounted throat members terminating in nozzle ends surrounded by unobstructed space, said members being carried thereby and arranged to enter a recess in a rubber heel member, and means to equalize the movement of the throat members from their inoperative position.

7. A fastening inserting machine having a throat comprising a plurality of pivoted members having nozzle ends of a size corresponding to that of the usual conical recesses in a rubber heel member, the space around said nozzle ends being unobstructed to permit them to enter said recess, means for forcing the throat members apart to stretch the rubber of the heel member during the insertion of a fastening, and a spring tending to equalize the movements of the throat members.

8. A fastening inserting machine having, in combination, a presser plate, and a pair of work-engaging throat members extending therethrough, tapering towards their work engaging portions and terminating in projections arranged to enter a recess in a work piece held against said presser plate, adjacent sides of the throat members being grooved to form a throat opening.

In testimony whereof we have signed our names to this specification.

GEORGE GODDU.
FRED L. MACKENZIE.

CERTIFICATE OF CORRECTION.

Patent No. 1,620,260. Granted March 8, 1927, to

GEORGE GODDU ET AL.

It is hereby certified that error appears in the printed specification of the above numbered patent requiring correction as follows: Page 2, line 60, claim 6, before the word "terminating" insert the words "carried thereby and"; line 61, for the word "members" read "ends"; and line 62, strike out the words "carried thereby and"; and that the said Letters Patent should be read with these corrections therein that the same may conform to the record of the case in the Patent Office.

Signed and sealed this 4th day of October, A. D. 1927.

Seal.

M. J. Moore,
Acting Commissioner of Patents.